UNITED STATES PATENT OFFICE.

CARL KUSSMAUL, OF BASLE, SWITZERLAND, ASSIGNOR TO THE SOCIETY OF CHEMICAL INDUSTRY, OF SAME PLACE.

METAAMIDOPHENOL.

SPECIFICATION forming part of Letters Patent No. 403,678, dated May 21, 1889.

Application filed April 5, 1888. Serial No. 269,731. (No specimens.) Patented in Germany March 18, 1888, No. 44,792, and in France April 19, 1888, No. 190,096.

*To all whom it may concern:*

Be it known that I, CARL KUSSMAUL, a citizen of Switzerland, residing at Basle, Switzerland, have invented new and useful Improvements in the Production of Metaamidophenol by melting the metamonosulpho-acid of amidobenzole with alkalies at 260° to 300° centigrade, of which the following is a specification.

This invention relates to the production of metaamidophenol, for which I have received Letters Patent in France, No. 190,096, dated April 19, 1888, and in Germany, No. 44,792, dated March 18, 1888.

In carrying out my invention I proceed as follows:

Example: I heat twenty kilograms of caustic soda with four kilograms of water in a cast-iron vessel. Add to this mass, while keeping its temperature at 270° centigrade, ten kilograms of dried metamonosulpho-acid of amidobenzole or its sodium salt and maintain the whole mass for one hour at from 280° to 290° centigrade. I dissolve the melt, when cold, in water, acidulate it with hydrochloric acid, remove all resinous substances by filtering, add carbonate of sodium or bicarbonate of sodium to liberate the amidophenol, and extract it with ether. It is, by recrystallization from hot water, obtained in a pure state. The metaamidophenol comes out in hard crystals, melting at 121° centigrade, (uncorrected.) It is easily soluble in ether, ethyl alcohol, and amyl alcohol, and shows much tendency to form oversaturated solutions. It is difficultly soluble in benzole, almost insoluble in ligroine, and pretty easily soluble in hot water. On cooling there are about eighty per cent. crystallizing out.

What I claim as new and original, and desire to secure by Letters Patent, is—

The production of metaamidophenol by melting the metamonosulpho-acid of amidobenzole with alkalies at from 260° to 300° centigrade.

In testimony whereof I have hereunto set my hand in the presence of two subscribing witnesses.

CARL KUSSMAUL.

Witnesses:
GEORGE GIFFORD,
N. HENZI.